United States Patent [19]

Lau

[11] Patent Number: 4,892,500

[45] Date of Patent: Jan. 9, 1990

[54] VERSATILE NETWORK OF MULTIPLE SPOUT BALLOONS

[76] Inventor: Po Chun Lau, 8224 Wilkinson Ave., North Hollywood, Calif. 91605

[21] Appl. No.: 162,663

[22] Filed: Mar. 1, 1988

[51] Int. Cl.⁴ ........................ A63H 3/06; F16L 41/00; G09B 23/26

[52] U.S. Cl. .................................... 446/221; 446/226; 434/279; 285/150

[58] Field of Search ............... 446/221, 220, 223, 224, 446/225, 226, 187; 434/278, 279, 280; 137/561 A; 285/95, 97, 150

[56] References Cited

U.S. PATENT DOCUMENTS

| | | | |
|---|---|---|---|
| 723,292 | 3/1903 | Metzger | 446/221 X |
| 1,703,463 | 2/1929 | Weigel | 446/224 X |
| 1,951,193 | 3/1934 | Heighway | 446/224 |
| 2,731,768 | 1/1956 | Harrowe | 446/226 |
| 3,756,274 | 9/1973 | Wolfgramm | 137/561.1 X |

FOREIGN PATENT DOCUMENTS

| | | | |
|---|---|---|---|
| 168292 | 9/1921 | United Kingdom | 446/220 |

*Primary Examiner*—Robert A. Hafer
*Assistant Examiner*—D. Neal Muir
*Attorney, Agent, or Firm*—Poms, Smith, Lande & Rose

[57] ABSTRACT

A versatile multiple spout balloon network is provided with thin walled resilient, single or multiple spout balloons which may be interconnected to other balloons or a pole using plugs. Plugs provide for resilient and airtight engagement of balloons at their spouts. Plugs may include an air channel for passage of air between balloons and the network. The network may include one or more poles, each pole having several branches. Balloons may make an airtight and resilient engagement with the poles at branches using a plug. A stand may be used to erect the plug pole by inserting the pole into a fitting hole in the middle of the stand. A plug unit may comprise multiple surfaces attached to, or integrated at, a central point in different patterns.

21 Claims, 2 Drawing Sheets

FIG. 1
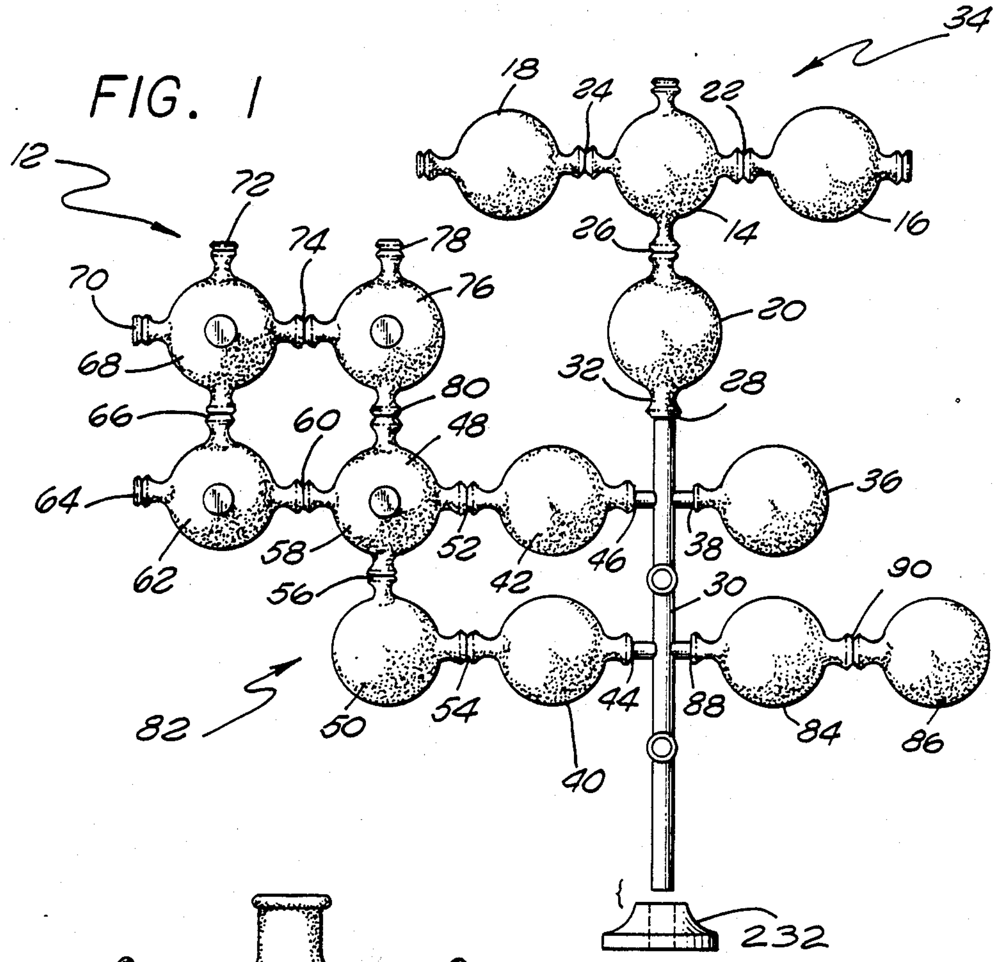
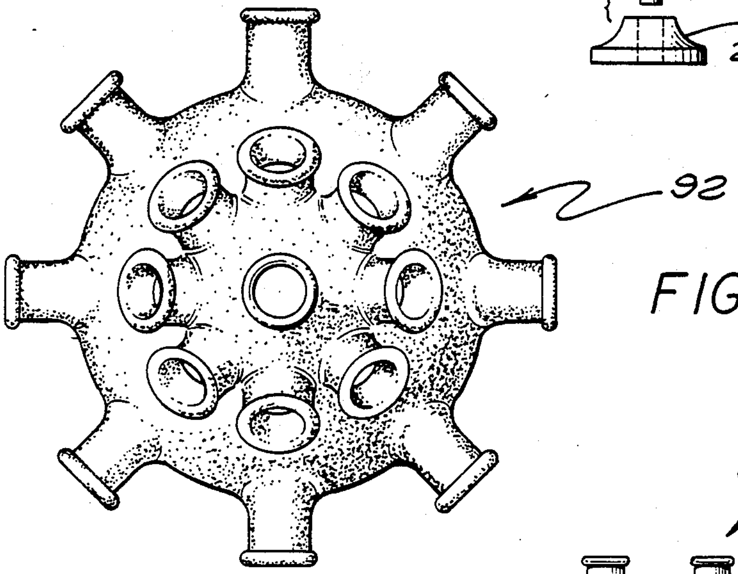
FIG. 2
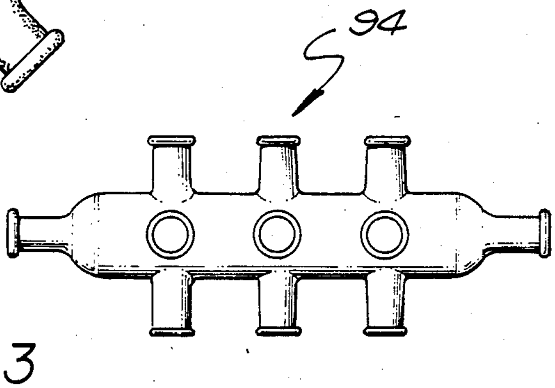
FIG. 3

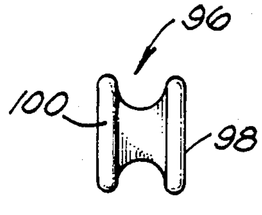
FIG. 4A
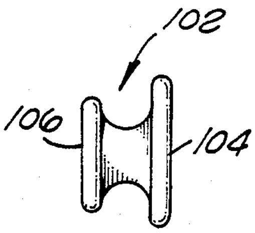
FIG. 4B
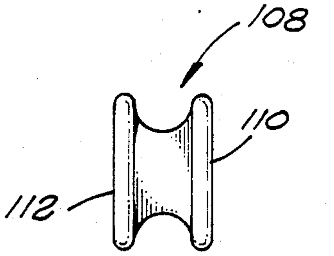
FIG. 4C
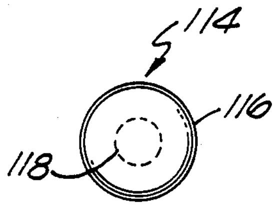
FIG. 5A
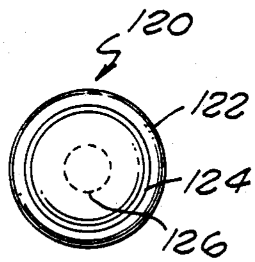
FIG. 5B
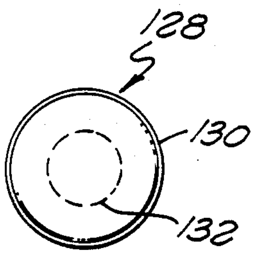
FIG. 5C
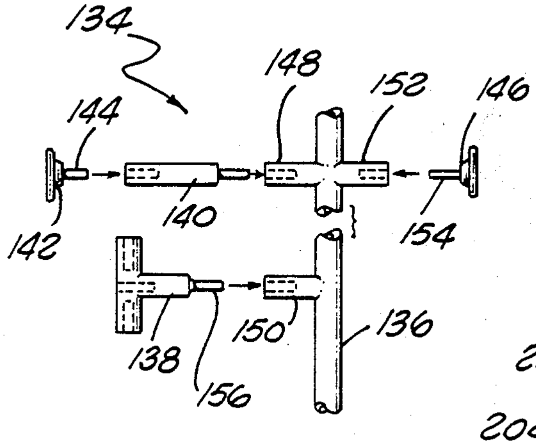
FIG. 6
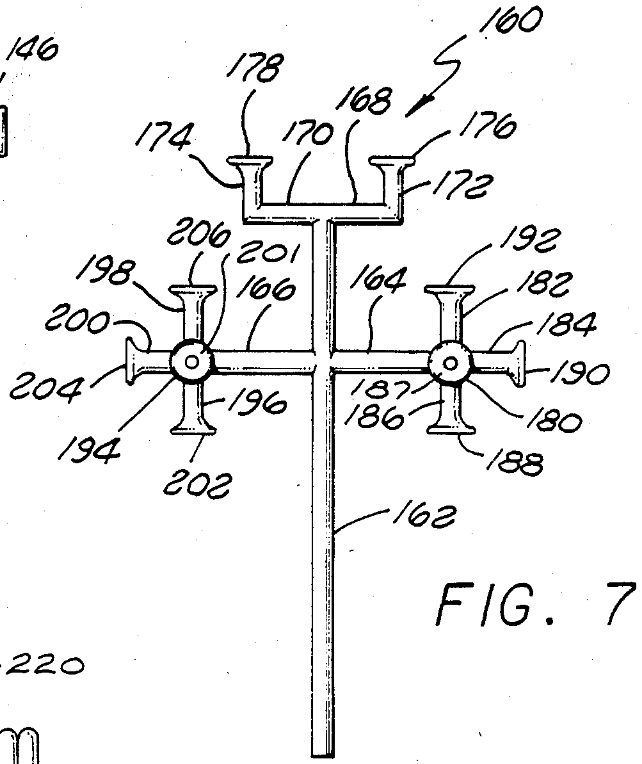
FIG. 7
FIG. 8
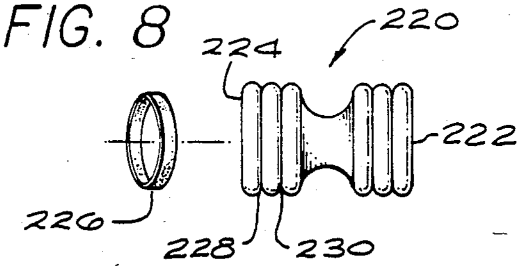

VERSATILE NETWORK OF MULTIPLE SPOUT BALLOONS

FIELD OF THE INVENTION

This invention relates to versatile networks of multiple spout balloons.

BACKGROUND OF THE INVENTION

Traditionally, conventional inflatable balloons have been linked together only in one dimension or in bundles with strings. Normally, a conventional balloon has only one spout, and is formed from thin walled resilient material such as rubber. The spout is used for inflating or deflating the balloon to a certain size. After inflating the balloon to the desired size, the spout is usually closed tight with a string to prevent gas from escaping the balloon.

For decorative purposes, a number of these balloons are tied together with strings to form a bundle of balloons for festive occasions. Each balloon spout is usually tied with a string. The strings are tied together at one or more knots. The balloons usually float freely about the knot point. Their movement is limited by the string length as well as the size and location of the adjacent balloons. The shape of the balloon bundle may be controlled by the length of the string attached to the balloon. However, since the balloons may float freely, it is difficult to fix their position with respect to a desired decorating pattern.

Further, once the balloons are tied down, the strings may become tangled, and untangling them becomes a difficult task. In addition, after the balloons are inflated and decoratively arranged, it is impractical to deflate them and leave the decorative arrangement intact. Thus, the balloons are usually inflated once and discarded after one use.

Inflatable toys formed of non-resilient material are also known. The toy consists of airtight fabric or flexible sheet material components that are connected to form the final toy. The interconnection between these inflatable components is usually done by glue or screw and nut. Further, the components may only be inflated to a predetermined size to obtain the proper shape of the toy, as determined by the size of the flexible but non-resilient inflatable components.

These toys are only limited to one configuration and may only be connected in one predetermined way. Further, these toys are not capable of forming a decorative structure of interconnected balloons.

Accordingly, the principal object of the present invention is to provide a decorative and versatile multi-dimensional network of thin walled, resilient and multiple spout balloons. The network shape may be modified readily by rearranging the balloons, or adding other balloons.

SUMMARY OF THE INVENTION

A network of resilient balloons in accordance with the present invention may include a plurality of inflatable balloons, having resilient expandable walls, each having one or more integral spouts, with each balloon capable of being interconnected to the network of balloons using a plug providing for a resilient and airtight engagement between two or more adjacent balloons. At least one of the balloons has at least two integral spouts.

Structurally, The balloons may be joined together spout to spout, horizontally, vertically, or in any possible direction or angle as permitted by the patterns of spouts on the balloons. There are many possible three dimensional arrangements for such a balloon network because each balloon may have many spouts, and each balloon may be interconnected to the network in many different ways.

Balloons are interconnected, using a plug, to each other or to the network using one or more of their integral spouts. These interconnections may be between two or more balloons, or between one or more balloons and a pole used for decorative purposes. The plug is used to provide for a resilient airtight engagement between two or more balloons, or one or more balloons and a pole. A plug may also be used to confine a balloon and prevent the escape of gas from the balloon.

Each balloon may have many integral spouts on its surface, limited, in space, to the balloon surface area. The spouts may be located symmetrically, or asymmetrically on the surface of the balloon. Spouts may have different sizes, and accordingly, plugs may also have different sizes to accommodate the different sizes of spouts. Any of the spouts on the surface of the balloon may be used to connect the balloon to the network or to another balloon, or to other surfaces or objects.

Plugs are used to provide an airtight engagement of two or more balloons. Normally, the plug has two or more end surfaces, with each end surface being connected to one spout and the other end surfaces being connected to other spouts. At each spout-to-plug joint, the spout fits tightly around one end of the plug to prevent air from escaping between the plug and the spout. The connecting end surfaces of the plug may have different sizes and shapes to accommodate airtight engagement of different size spouts, or spouts and poles. Thus, by using a desired plug, a very large spout may form a resilient airtight engagement with a very small spout without any damage to the spouts or leakage of air at the spout-to-plug joint.

A plug may also be used to provide for resilient, airtight engagement between a balloon spout and a branch on a pole. With this arrangement, the plug makes an airtight engagement with the branch at one end of the plug, and makes an airtight and resilient engagement with a balloon spout at the other end.

Plugs may be made of light and sturdy material so that the balloon network may be buoyant in air. The plugs may also be made of heavy and sturdy material if buoyancy in air is not desired. A plug may include an air channel that provides for passage of air between the two or more interconnected balloons. The plug may be substantially solid or hollow inside like a shell with thin but sturdy walls which are made of strong enough material such as plastic or metal to make a firm and airtight engagement with a balloon spout. The hollow plug may be airtight with no air outlet or it may have an air channel for conducting air between its two end surfaces. If all the plugs used in a network of balloons have air channels, air, helium or other fluids may freely travel between the balloons. In such a configuration, a single spout on the surface of any of the balloons may be used to inflate or deflate a few of the other balloons in the network. Thus the balloons may initially be interconnected in a deflated state (with little or no air in them) and may then be inflated at the same time. One major advantage is the capability of constructing the balloon network in a deflated state at one location, and then transferring the deflated network of balloons to the desired location where it may be inflated. Thus, not only the transportation becomes much simpler, but also groups of balloons may be deflated while preserving the network configuration for future use.

Plugs, such as a cross-shaped plug, may have several end surfaces with each end surface pointing in a desired direction in three dimensions. Structurally, such a plug may be viewed as having a core, a number or stems that are integrated with the core and an end surface at the end of each stem. The core and the plug stems may include air channels to provide for flow of air through the stems and the core.

Poles may also be used to further enhance the decorative capabilities of the network. Poles may be made of light material so that their use will not prevent the network from being buoyant in air; or alternatively, heavier material may be used to mount on a stand. Poles usually include a plurality of integral branches of the pole. Poles may be made into different shapes and sizes by adding removable branches to them; and the poles may be extended using removable branches that fit tightly onto the integral branches of the pole. The balloons may be connected to the poles using plugs. To prevent the escape of air from the pole branches, the removable branches may make an airtight engagement with the integral branches.

In addition, an independently assembled network of balloons may easily be interconnected to the pole and form a larger network. Similarly, a subnetwork may easily be separated from the network. Airtight engagement of a balloon spout and a pole may be achieved by a plug which makes an airtight engagement with a pole branch at one end, and a resilient airtight engagement with the balloon spout at the other end. These plug stems may be arranged or bent to point in any desired direction.

Accordingly, the present invention provides a versatile network of resilient balloons that achieves our main objectives, namely, versatility in the arrangement of the balloons in the network, capability for interconnection of balloons to the balloon network at one or several spouts, capability for inflating or deflating a portion of the network of balloons simultaneously, transportability of the constructed network at a deflated, inflated or semi-inflated state, and the possibility of interconnecting several subnetworks of balloons to form a larger network of balloons. Further, alternative arrays of balloons may be readily designed as extensions of the mechanical concepts described in the specifications.

Other objects, features, and advantages of the invention will become apparent from a consideration of the following detailed description and from the accompanying drawings.

BRIEF DESCRIPTION OF THE DRAWINGS

FIG. 1 is a front elevational view of a network of thin walled, resilient balloons illustrating the principles of the present invention;

FIG. 2 is a front elevational view of a multiple spout, thin walled, expandable balloon;

FIG. 3 is a front elevational view of another multiple spout, thin walled, expandable balloon;

FIG. 4A is a side view of a plug having two substantially identical end surfaces;

FIG. 4B is a side view of a plug having different size end surfaces;

FIG. 4C is a side view of a larger size plug having two substantially identical end surfaces;

FIG. 5A is an end view of the plug of FIG. 4A;

FIG. 5B is an end view of the plug of FIG. 4B;

FIG. 5C is an end view of the plug of FIG. 4C;

FIG. 6 is a partial front elevational view of a pole showing removable arm extensions and plug extensions;

FIG. 7 is a front elevational view of a another pole illustrating another arrangement of the pole with removable arm and plug extensions; and FIG. 8 shows an alternative plug arrangement with an associated rubber band for holding balloons onto the plug.

DETAILED DESCRIPTION

Referring more particularly to the drawings, FIG. 1 is a front elevational view of a network 12 of thin walled, resilient, multiple spout balloons, illustrating the principles of the invention. The network 12 may include as many balloons as desired, with the balloons interconnected in any way to obtain the desired shape for the network 12.

Balloon 14 includes 4 integral spouts and makes an airtight engagement with balloons 16, 18 and 20 using plugs 22, 24 and 26 respectively. Balloons 16, 18, 20 each have two integral spouts, and are capable of making an airtight engagement with two balloons. Plugs are used to make an airtight engagement with balloon spouts. The plugs 22, 24 or 26 may include an air channel for passage of gas between balloons 14 and 16, 14 and 18, or 14 and 20, respectively. If all three plugs 22, 24 and 26 include such an air channel, gas may freely move from one balloon to any other balloon among balloons 14, 16, 18 and 20.

Balloon 20 makes an airtight and resilient engagement with pole 30 using plug 28. The integral spout 32 of balloon 20 makes an airtight engagement with plug 28. Plug 28 may include an air channel for passage of gas between balloon 20 and pole 30. In the absence of such an air channel, (plug 28 may be removed from pole 30) while plug 28 and balloon 20 are still in an airtight engagement. Plug 28 could be an integral part of pole 30, or, using arrangements similar to those of FIG. 6, they may be removable. Thus, if plug 28 does not include an air channel, the subnetwork 34, which consists of balloons 14, 16, 18 and 20, may readily be removed, by removing plug 28, from the network 12, without any gas escaping from any of the balloons 14, 16, 18 or 20.

Balloon 36 includes only one integral spout, and is interconnected to pole 30 using plug 38 which makes resilient airtight engagement with the balloon spout. The plug 38 may include an air channel to facilitate passage of gas between pole 30 and balloon 36.

Balloon 42 includes two spouts, and makes a resilient airtight engagement, using plug 46, with pole 30. Balloon 42 also makes a resilient airtight engagement, using plug 52, with balloon 48. Similarly, balloon 40, which also includes two resilient integral spouts, makes a resilient airtight engagement with balloon 50 and pole 30, using plugs 54 and 44, respectively, at its two ends. Plugs 46 and 44 may include a fluid passage channel to allow gas movement between pole 30 and balloons 42 and 40, respectively. If plugs 44 and 46 lack an air channel, no gas may be exchanged between the pole and the respective interconnected balloons, 40 and 42. In this configuration, where plugs 44 and 46 do not include any means for passage of air between balloons 40 and 42, and the pole 30, plugs 44 and 46 may be removed from the network 12 without any impact on the gas content of balloons 40 and 42. Thus subnetwork 82, which includes balloons 40, 42, 50, 58, 62, 68 and 76, may be removed from network 12 without impacting the gas content in any of the balloons in subnetwork 82.

Balloon 84, which includes two integral resilient spouts makes a resilient airtight engagement with balloon 86 and pole 30, using plugs 90 and 88, respectively. Balloon 36, which is a single spout balloon, makes a resilient airtight engagement with pole 30, using plug 38. Plugs 38 and 88 may include an air channel for facilitating passage of air between pole 30 and balloons 36 and 84, respectively.

The pole 30 may be solid or hollow for facilitating passage of gas throughout the pole. If pole 30 is hollow and all of the plugs in network 12 include an air channel, gas molecules may freely move, subject to gas pressure constraints, from any of the balloons to any other balloon in the network 12 Thus some or all of the balloons defining a confined space may be inflated or deflated using one port, which may be a balloon spout or an opening in the pole.

The pole 30 may be mounted on base 232 which is used as a stand. In such an arrangement, it may be desirable to use a heavier pole and heavier plugs. If buoyancy is desired, a lighter pole and lighter plugs may be utilized.

Thus the network of balloons may be constructed in a deflated or inflated state, and then transported in a deflated or inflated state. Due to the large size of decorative balloons, when in inflated state, it is often difficult to transport a large number of them, using for example an automobile as transportation means. Using the present invention, the balloon network is easily constructed decoratively, and then transported in a deflated state to the destination.

FIG. 2 is the front elevational view of a resilient, multiple spout, expandable balloon 92. Balloon 92 includes multiple integral spouts that are located throughout its spherical shaped surface. Balloon 92 may be made of thin walled or thick wall resilient material and may be expanded to a desired size using any of the spouts, provided that the other spouts are sealed airtight using plugs or other means for sealing the spout. Balloon 92 may be interconnected to a network of balloons using one or more of its spouts. Each spout used for interconnecting balloon 92 to the network makes a resilient airtight engagement with a plug which itself engages resiliently and tightly to another balloon spout in the network or is connected directly to a pole.

Balloon 92 may include as many integral spouts as possible, limited to the surface area of the balloon. The spouts may have variable sizes because for each particular spout size, a plug with the corresponding size may be provided (see FIG. 4). Thus the spouts may have different sizes and may be distributed symmetrically or asymmetrically throughout the surface of the balloons. FIG. 3 is the front elevational view of a resilient, multiple spout, expandable oblong balloon 94. Balloon 94 represents the concept that the balloon may have two spouts, one at each end, and additional spouts, if desired, up to as many as may be permitted by the surface area of the balloon. Balloon 94, as shown, includes multiple integral spouts that are located throughout its oblong shaped surface. Balloon 94 is made of thin walled resilient material and may be expanded to a desired size using any of the spouts, provided that the other spouts are sealed airtight using plugs or other sealing means. Balloon 94 may be interconnected to a network of balloons using one or more of its spouts. Each spout used for interconnecting balloon 92 to the network makes a resilient airtight engagement with a plug which itself engages resiliently and tightly to another balloon spout in the network or is connected directly to a pole.

Balloon 94 may include as many integral spouts as are possible, limited to the surface area of the balloon. The spout may have variable sizes because for each particular spout size, a plug with the corresponding size may be provided (see FIG. 4). Thus the spouts may have different sizes and be distributed symmetrically or asymmetrically throughout the surface of the balloons.

The invention provides for utilization of many different sizes of balloons and integral balloon spouts. Balloons that are conventionally used for decorative purposes vary in sizes and shape. In the deflated state, the diameter range of these balloons is from less than an inch to more than 8 inches. In the inflated state, the diameter range is from approximately 3 inches to more than forty inches. Their respective spout diameters range from half an inch to approximately one and half inches. Since the spouts are resilient, they may make an airtight and resilient engagement with a plug which may be slightly larger in diameter than the diameter size of the spouts. These balloons are also made of thin walled resilient material which provides for capability to blow them up to various sizes. The wall thicknesses of these balloons range, in deflated state, about 0.005 inch to about 0.02 inch or 0.03 inch. In the inflated state, the wall thicknesses of these balloons will be substantially smaller, corresponding to the degree of inflation.

FIG. 4A is a side view of a plug 96 having two end surfaces 98 and 100, that are substantially equal in size. Plug 96 may include an air channel to allow passage of air between its two ends. The size of plug 96 may vary in length, width and thickness to accommodate different size spouts. Further, the shape of the end surfaces may be flat, and disc-like, as shown in FIG. 4A, or may be spherical, or have other desired shapes to provide for an airtight engagement between the balloon spout and the end surface of the plug, for example plug end surface 100.

FIG. 4B is a side view of another plug 102 having uneven end surfaces 104 and 106, with end surface 104 being larger in end surface area and in diameter than that of end surface 106. Plug 102 may accommodate an airtight engagement of two balloons having different size spouts. The larger balloon with the larger spout may make a resilient, airtight engagement with the larger end surface 104, while the smaller balloon with a smaller spout may make a resilient, airtight engagement with the smaller end surface 106.

FIG. 4C is a side view of another larger plug 108 having two end surfaces 110 and 112, with the two end surfaces 110 and 112 having substantially the same size. Plug 108 may have an air channel for passage of gases between its two ends.

If lacking an air channel, any of the plugs in FIGS. 4A, 4B, or 4C may be used to make a resilient airtight engagement with a spout of the corresponding size to prevent leakage of gas out of the balloon at that particular spout. For example, all of the plugs 64, 70, 72 and 78 in FIG. 1 lack an air channel, and are being used to seal those spouts which are not used to interconnect the balloons to the network 12.

Other types of plugs may be used to provide for a resilient, airtight engagement of a balloon with a branch on a pole. The systems of FIGS. 6 and 7, which are discussed below, include these types of plugs, for example plugs 146 and 142.

FIG. 5A is an end view of the plug 96 of FIG. 4A. Circle 116 represents the perimeter of surface 100 or surface 98 in FIG. 4A. The dashed line circle 118 indicates the perimeter of the air channel, if any, which may be included in plug 96.

FIG. 5B is an end view of the plug 102 in FIG. 4B. Circle 122 is the perimeter of surface 104 and circle 124 represents the perimeter of surface 106 in FIG. 4B. Circle 126 represents the perimeter of the air channel, if any, in plug 102 in FIG. 4B.

FIG. 5C illustrates an end view of the plug 108 in FIG. 4C. Circle 130 is the perimeter of surface 110 or surface 112 in FIG. 4C. Circle 132 is the perimeter of the air channel, if any, in plug 108.

FIG. 6 is an elevational front view of a portion of a pole assembly 134 in accordance with the present invention. The pole assembly 134 includes a main body part 136, removable branches 138 and 140, and plug extensions 142 and 146. Main body 136 includes integral branches 148, 150 and 152. The integral branches may be directly connected to a plug extension arm or other removable branches, such as 140 and 138, used for extending the size of the pole 134. Branch 152 is directly connected to plug 146. When connected, branch 152 and plug insert arm 154 form an airtight seal. Plug extension 146 is capable of making a comfortable, resilient, and airtight engagement with a balloon spout of compatible size.

A T-shaped removable branch 138 may be used to extend the size of the pole 136. The insertion arm 156 of the removable branch 138 makes an airtight engagement with branch 150. Two additional plugs may then be added to the two ends of removable branch 138. Removable branch 140 functions to extend the length of branch 148. Plugs 142 may be connected to branch 140, with insertion arm 144 of plug 142 making an airtight engagement with branch 140.

Plugs 146 and 142 and their respective insertion arms 154 and 144 may include an air channel to provide a passage way for gases from one end to the other end. Thus, if the pole 134 includes an air passage way throughout its body and branches, gas molecules may freely move through the body of the pole and into and out of the interconnected balloons, for example the balloons which may be interconnected using plugs 146 and 142.

FIG. 7 is an elevational front view of another pole 160 in accordance with the present invention. Main body 162 of the pole 160 includes four integral branches 164, 166, 168 and 170. The branches 164 and 166 provide for addition of more complex five-way removable branches 180 and 194. The five-way removable branch 180 includes five branches 184, 186, 182, 187 and a fifth branch going in the opposite direction from branch 187. Similarly, the five-way removable branch 194 includes three branches 196, 198, 200, 201 and a fifth branch going in the opposite direction from branch 201. Alternatively, branches 180 and 194 may be integral branches. Plugs 188, 190, 192, 202, 204 and 206 make an airtight engagement with branches 186, 184, 182, 196, 198 and 200, respectively. These plugs may have variable sizes to accommodate a resilient and airtight engagement with a balloon spout of the corresponding size. In addition, the branches 182, 184, 186, 187, 196, 198 and 200 may point to other desired directions.

Branches 168 and 170 provide for an L-shaped, airtight engagement with removable branches 172 and 174, respectively. Plugs 176 and 178 may then be used to make an airtight engagement with branches 172 and 174, respectively.

Some or all of the plugs and their respective insertion arms may include an air channel to provide a passage way for gases from one end to the other end. Thus, if the pole 160 includes an air passage way throughout its body and branches, gas molecules may freely move through the body of the pole and into and out of the interconnected balloons, for example the balloons which may be interconnected using plugs 188, 190, 192, etc.

FIG. 8 is a side view of a plug 220 having two end surfaces 222 and 224, that are substantially equal in size. Plug 220 may include an air channel to provide for passage of air between its two ends. The size of plug 220 may vary in length, width and thickness to accommodate different size spouts. Further, the shape of the outermost end surfaces may be flat, and disc-like as shown in FIG. 8 or may be spherical, or have other desired shapes. To provide for a tight engagement between the balloon spout and the end surface of the plug the rubber band 226 may be used to further secure the balloon spout to the plug. The grooves, indicated by line 228 and 230, on the plug also provide for a more secure engagement of a balloon spout and the plug by increasing the friction between the balloon spout and the plug. The plug in FIG. 8 may be used with heavier and bigger balloons because it is designed to make a more secure airtight engagement with balloon spouts. In addition, a plug such as the plug of FIG. 8 may have one or more grooves, as desired.

A review of prior art in this area makes it clear that the present claim is significantly different from the prior art systems. The Harrowe U.S. Pat. No. 2,731,768, teaches the arrangement of a toy by interconnecting, using screws or other similar parts, inflated parts of the toy. The toy parts have a definite predetermined size and shape and may only be interconnected to other inflated parts at one specific location. The Weigel U.S. Pat. No. 1,703,463, teaches an arrangement of single spout balloons used primarily as a musical or sound generating instrument. Further, the arrangement is not a versatile one and is rigidly interconnected to provide a tube-like musical instrument which produces sounds as air is transferred between the balloons. The Metzger U.S. Pat. No. 723,292 teaches the arrangement of toys by interconnecting, using long tubes and cords, inflatable parts of the toys. The tubes include shoulders used to secure the tubes to the inflatable toy parts. A cord is used to secure the tube to the inflatable part near the shoulder of the tube. The tube arrangement is rather complex as it usually includes a reed at one end and is secured to a trumpet, using a socket, at the other end. The arrangement is thus rather heavy and complex. The U.S. Pat. No. 721,051 to King teaches an arrangement of two balloons, one of which is inflated with a quantity of gas not sufficient to raise the balloons, and the other balloon inflated with air. When the air escapes the second balloon, the whole system moves up. When the second balloon is exhausted, the system moves down. The arrangement is not versatile and does not teach a balloon network. The present invention is different from the above-mentioned prior art because of the versatility it provides for arrangement of network of balloons. The network may consist of as many resilient balloons as possible, balloons may have many integral spouts, may have different sizes, may be easily added to or taken out of the network. Further, plugs having multiple end surfaces, or poles having multiple branches may be easily integrated into the balloon network. The network may be buoyant in air due to the light weight of the material used. The network may easily be developed in any three-dimensional direction with significant degree of versatility. The plugs may be readily used to make an airtight engagement between balloons of diverse sizes without a need for a cord. Other differences are explained in detail hereinabove.

In conclusion, it is to be understood that the foregoing detailed description and the accompanying drawings illustrate the principles of the invention However, various changes may be made without departing from the spirit and scope of the invention. Thus by way of example and not of limitation, the balloons may each have one or more integral spouts, with each integral spout having any desired size; the balloons being made of resilient and thin walled material capable of expanding to a desirable size; the spouts may have variable sizes, each plug having at least two end surfaces; the plugs may be made of firm material such as styrofoam, wood, metal, plastic, rubber, clay; the spouts may be made of light material, such as styrofoam to provide for buoyancy of the network in air, or alternatively, made of heavy material if buoyancy is not desired. The pole may be extended using different types of removable branches, such as three way, L-shaped, or other branches; the pole may be made of light material to provide for buoyancy of the network in air, or may be made of heavy material to fix the position of the network in one location when mounted on a stand; further, the pole may have various shapes, for example circular or arc like shape, it may have only one branch or many branches in any extending in three dimensions. Further, the cross shaped plugs or other versatile plugs mentioned above may be mounted on a pole branch to provide a more decorative network arrangement; moreover, the plugs may have a loop or fastener attached to one end such that the network could be hung on the wall or other support structures using this plug. In addition, a plug may include a spherical core having several insertion openings, for insertion of removable plug stems into these openings. The core may be hollow for providing passage of air between its various openings, or alternatively, it may be solid to prevent passage of air between its openings. The core may have other desired shapes such as an elliptical or cubical shape. Further, the core and the stems may form one integrated plug having several end surfaces. For this configuration, none of the plug stems may be removed from the core. In addition, spherical plugs, for example, could be employed to close unused spouts, and these spherical plugs would have inner and outer end surfaces.

Accordingly, the present invention is not limited to the network configurations, balloons, poles or plugs shown in the drawings and described hereinabove.

What is claimed is:

1. A versatile network of multiple spout inflatable toy balloons comprising:

a plurality of inflatable balloons being formed of material which is resilient and expandable, each of said balloons having a body and at least two integral spouts, formed of the same material as the remainder of said balloon with said spouts being necked down and extending from the body of the balloon, each said balloon constituting a single air chamber and being continuously inflatable to any desired size up to a certain maximum size beyond which it may explode, each said balloon comprising film walls which are expandable and stretchable to many times their non-inflated configuration;

at least one plug, each of said plug having at least two ends with at least one end including means for making an airtight joint with a balloon spout, said spout making resilient airtight engagement with a corresponding end of said plug; and each said balloon being capable of interconnecting to at least another one of said balloons using one of said plugs at each interconnection, with one end of said plug making resilient airtight engagement with a spout of one of said balloons, and another of said ends of said plug making resilient airtight engagement with a spout of another one of said balloons;

whereby said balloons may be interconnected in a deflated state to form an airtight, versatile, three dimensional network of balloons, which may be readily transported and inflated to form a network at a chosen location.

2. A versatile network of inflatable balloons as defined in claim 1 wherein said plugs used in interconnection of said balloons include two end surfaces, with said end surfaces being substantially equal in size.

3. A versatile network of inflatable balloons as defined in claim 1 wherein only a few of said plugs used for interconnecting said balloons include fluid passage means for conducting fluids between said interconnected balloons, and the rest of said plugs prevent passage of fluids between the adjacent balloons;

whereby said network of balloons includes a few subnetwork of balloons, with no passage of gases between the subnetworks; each subnetwork capable of being inflated or deflated substantially concurrently through a single spout on any of said balloons interconnected to the subnetwork; absence of air passage way between said subnetworks provides the capability for detaching said subnetworks from the network in an inflated or a deflated state without having any impact on the gas level in the rest of the balloons in the network.

4. A versatile network of inflatable balloons as defined in claim 1 wherein said balloons range in diameter, from less than an inch to more than eight inches, when in a deflated state, and, from less than three inches to more than forty inches, when in fully inflated state, with the diameter size of the spouts ranging from half an inch to one and half inches, and the wall thickness of the balloons ranging from 0.005 inch to 0.02 inch.

5. A versatile network of inflatable balloons as defined in claim 1 wherein said plugs used in interconnection of two said balloons include two end surfaces, with one end surface being larger than the other end surface.

6. A versatile network of inflatable balloons as defined in claim 1 wherein said plugs used in interconnection of said balloons include multiple end surfaces.

7. A versatile network of inflatable balloons as defined in claim 1 wherein said plugs used in interconnection of said balloons are made of sturdy and firm material.

8. A versatile network of inflatable balloons as defined in claim 1 further comprising at least one pole including a plurality of integral branches, each integral branch including means for making an airtight engagement with one end of one of said plugs; whereby said balloons make a resilient airtight engagement with one of said plugs on said pole.

9. A versatile network of inflatable balloons as defined in claim 8 wherein said pole includes air channel means for passage of air between its branches.

10. A versatile network of inflatable balloons as defined in claim 8 wherein said pole includes means for preventing passage of air between its branches.

11. A versatile network of inflatable balloons as defined in claim 8 wherein said pole further comprises removable branches, said removable branches including means for making an airtight engagement with integral branches of said pole, and said removable branches including means for making airtight engagement with one end of said plug.

12. A versatile network of inflatable balloons as defined in claim 8 wherein said pole includes air channel means for passage of air between its branches;

said plugs include multiple integrated end surfaces.

13. A versatile network of multiple spout inflatable balloons comprising:

a plurality of inflatable balloons of thin walled, resilient and expandable material each having at least one integral spout, each said balloon being continuously inflatable to any desired size up to a certain maximum size beyond which it may explode;

at least one of said balloons having at least two integral spouts;

a plurality of plugs each having at least two end surfaces, with at least one end surface including means for making an airtight joint with a balloon spout, the spout making resilient airtight engagement with the corresponding end surface of said plug;

each said balloon being capable of interconnecting to at least another one of said balloons using one of said plugs at each interconnection, with one end surface of said plug making resilient airtight engagement with a spout of one of said balloons, and another end surface of said plug making resilient airtight engagement with a spout of another one of said balloons;

spouts, on said balloons, which are not used for interconnecting said balloons to the balloon network, making airtight engagement with one end of said plugs, with the other end of said plugs being exposed;

said balloons range in diameter, from less than an inch to more than eight inches, when in a deflated state, and, from less than three inches to more than forty inches, when in fully inflated state, with the diameter size of the spouts ranging from half an inch to one and half inches, and the wall thickness of the balloons ranging from 0.005 inch to 0.02 inch;

whereby said balloons may be interconnected in a deflated, fully-inflated, or intermediate level inflated state to form an airtight, versatile, three dimensional network of balloons, which may be readily transported when said balloons are deflated or inflated without interfering with decorative arrangement of these balloons.

14. A versatile network of inflatable balloons as defined in claim 13 wherein said plugs used in interconnection of said balloons include multiple end surfaces.

15. A versatile network of inflatable balloons as defined in claim 13 wherein said plugs used for interconnecting said balloons include fluid passage means for conducting fluids between said interconnected balloons;

whereby said network of balloons may be inflated or deflated simultaneously through a single balloon spout of any of said balloons interconnected to the network.

16. A versatile network of inflatable balloons as defined in claim 13 wherein a few of said plugs used for interconnecting said balloons include fluid passage means for conducting fluids between said interconnected balloons, and the rest of said plugs include means for preventing passage of fluids between the adjacent balloons;

whereby said network of balloons may include a few subnetwork of balloons, each subnetwork capable of being inflated or deflated simultaneously through a single spout on any of said balloons interconnected to the subnetwork; with no air passage way between said subnetworks providing the capability for detaching said subnetworks from the network in an inflated or a deflated state without having any impact on the gas level in the rest of the balloons in the network.

17. A versatile network of inflatable balloons as defined in claim 13 further comprising at least one pole including a plurality of integral branches, each integral branch including means for making an airtight engagement with one end of one of said plugs;

whereby said balloons may make a resilient airtight engagement with said plugs on said pole.

18. A versatile network of multiple spout inflatable balloons comprising:

a plurality of inflatable balloons of thin walled, resilient and expandable material each having multiple integral spouts, each said balloon being continuously inflatable to any desired size up to a certain maximum size beyond which it may explode;

a plurality of plugs each having at least two end surfaces, with at least one end surface including means for making an airtight joint with a balloon spout, the spout making resilient airtight engagement with the corresponding end surface of said plug;

each said balloon including means for interconnecting to at least another one of said balloons using one of said plugs at each interconnection, with one end surface of said plug making resilient airtight engagement with a spout of one of said balloons, and another end surface of said plug making resilient airtight engagement with a spout of another one of said balloons;

spouts, on said balloons, which are not used for interconnecting said balloons to the balloon network, making airtight engagement with one end of said plugs, with the other end of said plugs being exposed;

said balloons range in diameter, from less than an inch to more than eight inches, when in a deflated state, and, from less than three inches to more than forty inches, when in fully inflated state, with the diameter size of the spouts ranging from half an inch to one and half inches, and the wall thickness of the balloons ranging from 0.005 inch to 0.02 inch;

at least one pole including a plurality of integral branches, each branch including means for making an airtight engagement with one of said plugs.

19. A versatile network of inflatable balloons as defined in claim 18 comprising a central body, and wherein said plugs include multiple removable plug stems;

each plug stem including an end surface capable of making an airtight engagement with a balloon spout;

each plug stem being removable from said central

20. A versatile network of multiple spout inflatable toy balloons comprising:

a plurality of inflatable balloons of resilient and expandable material each having at least one integral spout, each said balloon being continuously inflatable to any desired size up to a certain maximum size beyond which it may explode;

at least one of said balloons having at least two integral spouts;

at least one plug, each of said plugs having at least two ends, with at least one end including means for making an airtight joint with a balloon spout, the spout making resilient airtight engagement with a corresponding end of said plug;

each said balloons being capable of interconnecting to at least another one of said balloons using one of said plugs at each interconnection, with one end of one of said plugs making resilient airtight engagement with a spout of one of said balloons, and another end surface of said one plug making resilient airtight engagement with a spout of another one of said balloons; and the spouts on said balloons, which are not used for interconnecting said balloon to the balloon network, making airtight engagement with one end of one of said plugs, with another end of said plug being exposed and sealed;

whereby said balloons may be interconnected in a deflated state to form an airtight, versatile, three-dimensional network of balloons, which may be readily transported when said balloons are deflated. each said balloon comprising film walls which are expandable and stretchable to many times their non-inflated configuration;

at least one plug, each of said plugs having at least two ends with at least one end including means for making an airtight joint with a balloon spout, said spout making resilient airtight engagement with a corresponding end of said plug; and each said balloon being capable of interconnecting to at least another one of said balloons using one of said plugs at each interconnection, with one end of said plug making resilient airtight engagement with a spout of one of said balloons, and another of said ends of said plug making resilient airtight engagement with a spout of another one of said balloons;

whereby said balloons may be interconnected in a deflated state to form an airtight, versatile, three dimensional network of balloons, which may be readily transported and inflated to form a network at a chosen location.

21. A versatile network of multiple spout inflatable toy balloons comprising:

a plurality of inflatable balloons of resilient and expandable material each having at least two integral spouts, formed of the same material as the remainder of said balloons and being necked down and extending from the body of the balloon, each said balloon constituting a single air chamber, each said balloon comprising film walls which are expandable and stretchable to many times their non-inflated configuration;

means for interconnecting each balloon to at least another one of said balloons using one of said spouts at each interconnection; and each said balloon being continuously inflatable to any desired size up to a certain maximum size beyond which it may explode, said balloons ranging in diameter from less than an inch to more than eight inches, when in a deflated state, and from less than three inches to more than forty inches, when in fully inflated state, with the diameter size of the spouts ranging from half an inch to one and one-half inches, and the wall thickness of the balloons ranging from 0.005 inch to 0.02 inch; whereby said balloons may be interconnected in a deflated state to form an airtight, versatile, three dimensional network of balloons, which may be readily transported and inflated at a chosen location.

* * * * *